United States Patent
Burke et al.

[11] 3,871,665
[45] Mar. 18, 1975

[54] ROD WIPER ASSEMBLY

[75] Inventors: John A. Burke, Rocky River, Ohio; Thorval L. Berg, Warminster, Pa.

[73] Assignee: Greene, Tweed & Co., Inc., North Wales, Pa.

[22] Filed: Apr. 9, 1973

[21] Appl. No.: 349,353

[52] U.S. Cl............ 277/24, 277/112, 277/153, 277/212 F, 277/170
[51] Int. Cl............ F16j 15/00, E21b 33/08
[58] Field of Search......... 277/24, 153, 112, 212 F, 277/170, 237 R

[56] References Cited
UNITED STATES PATENTS

| | | | |
|---|---|---|---|
| 3,218,087 | 11/1965 | Hallesy | 277/112 |
| 3,549,154 | 12/1970 | Jones | 277/24 |
| 3,642,290 | 2/1972 | Millsap | 277/24 |

FOREIGN PATENTS OR APPLICATIONS

| | | | |
|---|---|---|---|
| 251,426 | 2/1964 | Australia | 277/24 |
| 656,657 | 8/1951 | Great Britain | 277/153 |

*Primary Examiner*—Samuel B. Rothberg
*Attorney, Agent, or Firm*—Seidel, Gonda & Goldhammer

[57] ABSTRACT

To protect the primary seal of a hydraulic-actuated piston rod against the entry of contaminants thereto, a rod contamination barrier scraper/wiper assembly is provided featuring novel configuration of the scraper/wiper element and the manner of its installation, assuring retention of the scraper/wiper element against displacement from its fixed position, maintaining yieldable circumferential contact between the lip of the scraper/wiper and the reciprocating piston rod and a positive seal between the heel of the scraper/wiper and a static surface.

9 Claims, 3 Drawing Figures

PATENTED MAR 18 1975    3,871,665

ROD WIPER ASSEMBLY

DISCLOSURE

In conventional systems employing a hydraulically-actuated piston to transmit motion to a device outside of the sealed piston chamber containing the working fluid, a primary seal is provided adjacent the opening in the cylinder wall through which the piston rod reciprocates. Such primary seal generally comprises an elastomeric O-ring surrounding the piston rod and retained in a circumferential groove of the housing beyond the piston chamber. In certain installations, particularly where the piston rod outside of the sealed hydraulic chamber is exposed to dust and dirt, it has been recommended practice further to provide a scraper or wiper in contact with the piston rod beyond the primary seal, to protect against entry of contaminants such as dirt, water, and dust into the primary seal or perhaps past such seal into the piston chamber. The need for such "contamination barrier scraper/wiper" hereinafter called wiper for brevity, has been particularly emphasized in connection with actuating mechanism for aircraft landing gear, landing gear shock struts, flight control actuators, brake cylinders applied to aircraft wheel brakes and the like. In these types of installations, to assure acceptable performance, the wiper or scraper must satisfy rigid performance tests.

Among the major drawbacks encountered in earlier proposed wiper assemblies for piston rods are these:

1. Although the design was such that the wiper was maintained in contact with the surface of the rod, a secondary open leak path was formed around the outer wall of the wiper and the groove within which the wiper element was housed, permitting flow of dust, dirt and water towards the primary seal with possible ultimate damage to the seal.

2. Unprevented axial movement of the wiper or a portion thereof within its housing effecting a "pumping action" on reciprocation of the piston rod.

3. Uncontrolled displacement of the wiper heel onto the rod effecting a positive seal displacement of the wiper from the gland due to pressure build-up between the adjacent seal and the wiper.

A recently proposed wiper assembly designed for application to aircraft landing gear actuators, is described in U.S. Pat. No. 3,549,154. The advantages of the present wiper assembly over the patented design will be appreciated from the description hereinbelow of certain features of the present invention which are absent from the system described in the patent. An earlier form of pressure seal for aircraft control rods is described in U.S. Pat. No. 2,413,671, designed to maintain the internal presssure of the aircraft when flying at high altitudes; however in this design the positive wiping or scraping of the piston rod is neither contemplated nor adequately effected.

Among the objects of the present invention is the provision of a wiper assembly for hydraulic or pneumatic actuated piston rods which overcomes the design deficiencies and resulting drawbacks of previously proposed wiper assemblies, and to provide an improved wiper assembly of simple and relatively inexpensive construction, capable of satisfactory performance for acceptably long periods, and meeting rigid performance tests advanced by the industry.

The foregoing objectives are attained, in accordance with the invention, by the principal novel features including the provision of positive mechanical means for retaining the wiper element in fixed position within its housing; the provision for maintaining only the lip of the wiper element in spring-loaded contact with the rod at a small angle in such an arrangement that excessive internal pressure buildup against the wiper is automatically relieved without displacing it.

The novel features of the invention will be understood and its several attained advantages appreciated from the detailed description which follows, read in connection with the accompanying drawings, wherein.

Figure 1:
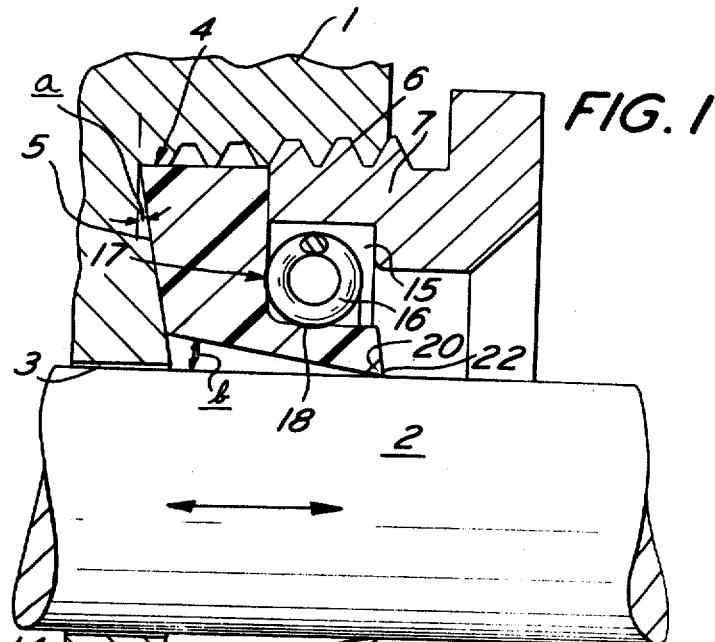
FIG. 1 is a sectional view of the wiping assembly shown in association with the external portion of a piston-actuated rod.
Figure 3:
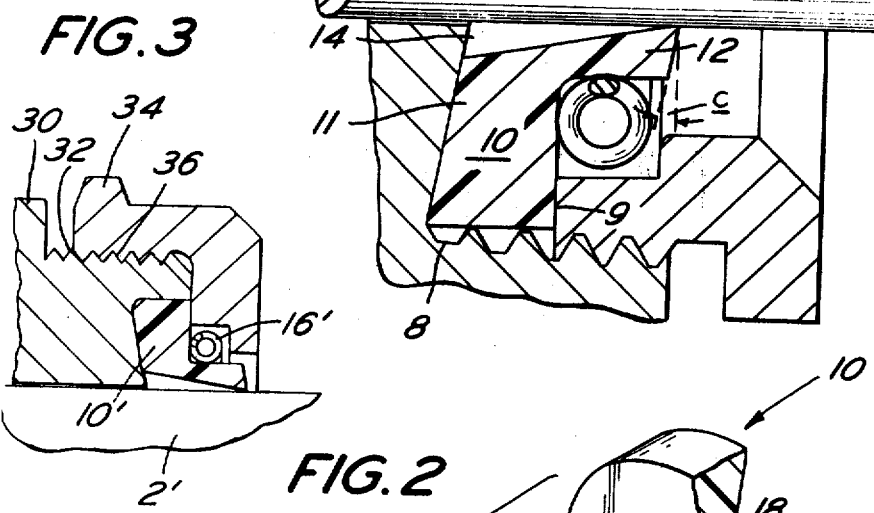
FIG. 3 is a sectional view of the wiping assembly shown in an alternative retaining construction.

Referring to FIG. 1, the numberal 1 generally designates a fragmentary portion of a housing, such as the forward cylindrical wall at the outer end of a conventional piston chamber beyond the primary seal (not shown) surrounding the piston rod 2 which rod is mounted for reciprocating movement into and out of the piston chamber through a central clearance opening 3 therein, and under hydraulic force. The housing wall or rod bearing sleeve is counterbored as indicated at 4 to a depth providing a shoulder 5 constituting the rear or inner wall of the counterbore 4. Counterbore 4 is screw threaded internally as indicated at 6 to mate with a correspondingly externally screw-threaded retaining collar 7 of shorter axial length than that of the counterbore. In the embodiment illustrated in FIG. 1 the major diameter of the threads cut in bore 4 is decreased at 8 beyond collar 7 as a result of the usual lead taper of the thread cutting tool employed. Other retaining collar structures such as shown in FIG. 3 may be used.

Figure 2:
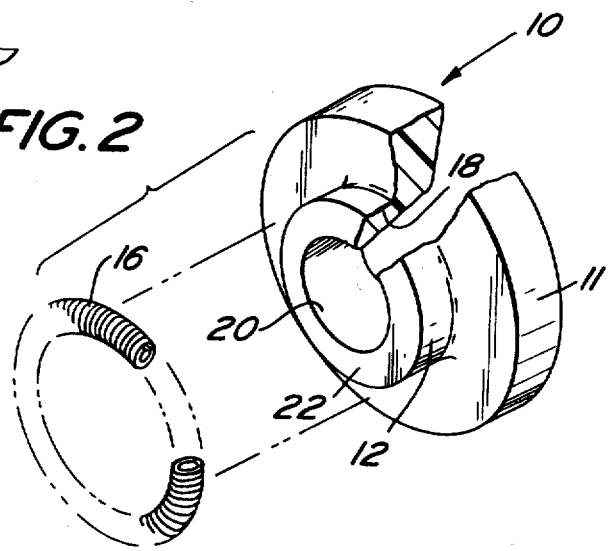
FIG. 2 is a detached perspective view of the wiper element and the garter spring.

Tightly pressed between the inner or foot end 9 of the retaining collar 7 and the shoulder 5 of the housing is the wiper element 10, shown in perspective in FIG. 2. The wiper element is made up of an annular cylindrical body portion 11 having a comparatively thick circumferential wall of an external diameter approximately equal (except for slight clearance) to the diameter of the counterbore 4, and an integrally formed thinner-walled cylindrical lip portion 12 axially extending therefrom near its internal diameter, such that the half-sections of the wiper element are boot shaped or approximately L-shaped in radial cross-section. The internal edge wall of housing 1 forming the shoulder 5, considered in the radial direction from the lateral wall of counterbore 4 toward the central axis, slopes outwardly (to the right in the drawings), forming an acute angle $a$ with a line perpendicular to the central axis. Angle $a$ may be from 5° to 15° or somewhat larger, but preferably about 15°. The rear wall of the wiper element 10, furthest away from the lip portion 12, is shaped, in the illustrated embodiment, to slope at the same angle $a$ and parallel to the shoulder 5, so that when the element 10 is in place its rear wall abuts and mates with shoulder 5.

The central opening 14 in wiper element 10 is frusto-conical in form with the base of the frustum (major diameter) proximate the shoulder 5 and the other end (minor diameter) at the outer edge of the lip portion 12, thus providing a smooth continuous face running from the outer edge of the body portion to the outer edge of the lip portion of the wiper. The minor diameter of the central opening 14 in the wiper element, in relaxed unassembled condition, is somewhat less than the diameter of the rod, so that when the element is pushed onto the rod it will fit in tight sliding contact therewith, the element being formed of lowfriction material as will be explained hereinafter. The angle of the sloping internal wall of the opening 14 must be within certain critical limits to obtain the full advantages of the present invention. Thus, it has been found, that angle $b$ formed between the sloping lateral wall of central opening should be about 10°; or stated otherwise, the angle formed between the sloping wall of opening 14 and a perpendicular drawn to the base of the frustum should be about 10°. The angles referred to in the preceding sentence may vary from about 5° to 15°.

The retaining collar 7, at its outer end wall, proximate the central opening therein, is formed with a radially inwardly directed stepped flange portion 15, forming a circumferential annular channel between the inner shoulder of flange 15 and the forward wall of the wiper element that is in compressive contact with the foot 9 of the retaining collar. A garter spring 16, preferably formed of coiled wire, is contained between the inner face of flange 15 and the opposed forward side of body portion 11 of the wiper element when the retaining collar is tightened against the element 10. Considering the radial section cut through wiper element 10 as being boot-like in shape, the juncture of the ankle of the boot with the lip portion 12, corresponding to the instep, is curved to provide an arc 17 which is less than the outer circumference of the garter ring 16, so that in assembled position, with the retaining collar tightened against element 10, the shoulder of flange 15 will retain the garter spring 16 to nest in the instep of element 10 adjacent the arc 17 of that element.

By the circumferential inward pressure of the spring on lip 12, the toe or tip 20 thereof is maintained in contact with the outer circumferential surface of rod 2. The forward edge wall 22 of the lip 12, in a direction outwardly from the circumferential surface of rod 2, slopes rearwardly forming an angle $c$ with a line perpendicular to the central axis, such angle providing a scraping lip to properly deflect contaminants from the rod surface. Thus, there is provided substantially point contact between the tip 20 of lip 12 and rod 2 such that the element 10 wipes the surface of the rod at the angle $b$ during its outward movement from the piston chamber and scrapes the rod on its return stroke at about the acute angle $c$ along the contacting edge of face 22 of the lip.

FIG. 3 shows the wiping assembly in an alternative retaining construction. Sturcture identical to that shown in FIGS. 1 and 2 is indicated by the same reference numberal having a prime notation.

The rod 2' is suitably mounted for reciprocating movement within a housing 30. The housing 30 is provided with external threads 32 which cooperate with internal threads 36 on retaining collar 34. The wiper element 10' is maintained in the desired disposition as shown by contact with the opening in housing 30 and collar 34. The lip of wiper 10' is adapted to receive spring 16'. The wiper 10' and spring 16' function in a manner identical to that described with respect to wiper 10 and spring 16.

The present invention is not limited to any particular collar or retaining structure. The collar need not be threadedly secured to the housing. Any other desired means of connecting the collar may be utilized.

The element 10 is made of a rigid plastic material having low coefficient of friction and low adhesion properties. While the compression molded resin of which the wiper element is composed is hard enough to be machined, it is sufficiently deformable to flex under sufficient applied pressure. Preferably it is made of virgin or filled polytetrafluoroethylene (TFE) sold under the trademark TEFLON. The garter spring 16 is preferably formed of an endless helically coiled wire, but other resilient materials performing the same described function may be substituted, if desired, such as a ring formed of elastomeric material having a radially directed spring force when in use.

The outer face of the collar 7 may be provided with slots, projections, wrenching flats or other known means to facilitate application of a tool for tightening the same.

Having now described the structural elements of the wiper assembly and their arrangement with respect to a reciprocating hydraulically actuated piston rod, some of the advantages of the particular design will be pointed out. It will be appreciated from the background description above, that although a primary sealing ring assembly, comprising an O-ring or the like, will normally be employed near the opening in the end wall of the piston chamber, containing the hydraulic fluid and through which opening, the piston rod reciprocates, that such primary seal alone has in practice been found insufficient to prevent leakage of hydraulic fluid from the chamber or to protect against the entry of dirt and other contaminants picked up by the rod externally of the sealed chamber. Such contaminants may ultimately work their way into and past the primary seal with resulting damage to the system or seal. The problem is particularly pronounced in situations where the piston rod outside of the piston chamber is exposed to dusty and dirty environment. For this reason, wipers or so called "contamination barrier scrapers" are installed in contact with the piston rod outside of the piston chamber for desired protection against contaminants being brought back into the chamber by the retracting piston rod.

By the design and arrangement hereinabove described certain of the deficiencies in prior systems are avoided. Thus, the element 10 in the present wiper assembly serves not only to wipe and scrape the surface of the piston rod during its reciprocatory movement, but also operates as a seal across its static surfaces. Since the tip 20 of the wiper lip is normally maintained in wiping contact with the surface of the rod 2 under inward pressure of the spring 16, it can stop seepage past the tip of any small film of fluid that may have seeped beyond the primary seal for any reason. It will do so, so long as the pressure of the pool of fluid collecting in the wedge between element 10 and the surface of the rod is insufficient to overcome the spring force by which the tip 20 is urged in contact with the surface of the rod.

When the pressure of the wedged fluid against the tip 20 exceeds the loaded pressure of the spring against the lip 12, the tip 20 will be raised as a result of such pressure permitting fluid to flow past the tip while preventing reverse flow of fluid during retraction of the piston rod, because of the scraping action of the tip at face 22. In the described design, employing a wiper element formed of TEFLON, oriented and arranged in the manner described with an appropriate spring load, the tip will yield at internal pressure loads of about 10 psig. In addition the spring loaded lip as described will more intimately follow small, rapid, radial rod deflections such as normally encountered in hydraulic rod type applications thereby further increasing its effectiveness as a wiper.

In the described embodiment according to the invention, the rear or inner wall of the body of element 10 is wedge-shaped to abut and mate with the sloping wall of the shoulder 5 of the housing, the element being tightly held against that wall by the compressing action of retaining collar 7. By this arrangement bodily movement or inward deflection of the body portion 11 is prevented in a direction parallel to the axis of the rod thus precluding pumping action thereby. Displacement of the heel of the wiper radially toward the rod by compression of body portion 11 is prevented because of the sloping direction of the shoulder 5; thus the spacing at angle $b$ between the heel of element 10 and the rod is constantly maintained. When the scraper element 10 and garter spring 16 are assembled in the hydraulic cylinder, and retained by the collar 7, the piston rod 2 is not normally present. The engagement of the sloping wall 5 of the housing and its mating sloping surface of the scraper body will be self centering, thus assuring concentricity of the scraper element to the housing without the aiding presence of the piston rod.

The retaining collar 7, by the arrangements described, accomplished several novel functions, thus 1. Because of the retaining action of flange 15, the spring 16 cannot be displaced from its designed location within the channel formed between the flange and element 10.

2. The retaining collar serves mechanically to lock wiper element 10 in fixed position; and 3. It exerts a compressive force axially against the wiper element to enable the latter to act as a face gasket and thus prevent a secondary or static leak path from being formed aroung the spring and along the lateral and rear walls of the counterbore 4.

The sharp angle between the tip 20 and the rod both axially and radially to the axis of the rod assures wiping of the rod and retention of a small pool of fluid behind the point of contact of the tip or the wiper with the rod during the stroke of the piston rod and the efficient scraping by the face 20 of the tip of any contaminant from the rod during its return stroke.

While the wiper assembly of the invention has been set out above as particularly applicable in certain hydraulic-actuated aircraft equipment, it will be understood that the invention is not limited thereto, but may be applied in other mobile and industrial equipment and other installations calling for wiping of a reciprocating rod member.

The present invention may be embodied in other specific forms without departing from the spirit of essential attributes thereof and, accordingly, reference should be made to the appended claims, rather than to the foregoing specification as indicating the scope of the invention.

What is claimed is:

1. A piston rod wiper assembly arranged for circumferential contact of a wiper element of said assembly with a reciprocating piston rod comprising:

a housing having a first central axis opening through which the piston rod is adapted to reciprocate, said housing being further provided with a concentric cavity at its outer end of greater diameter than that of said first central opening, thus forming an inner rear wall for said cavity; an annular wiper element formed of rigid, durable plastic material, fixedly arranged in said cavity; said wiper element having a body portion and an integral lip portion of reduced diameter extending axially from the body portion and having an internal circumferential face continuous with that of said body portion and an outer circumferential face intersecting the forward wall of said body portion; an annular retaining collar attached to the housing with the inner face of the collar contacting the forward wall of the body portion of said element to press the rear wall of the body portion into abutment with the rear wall of said cavity thereby forming a static seal; said retaining collar further having a flange extending radially inward toward said lip portion, thereby forming a channel between said flange and said wiper element; spring means in said channel surrounding the outer circumferential face of at least part of said lip portion adjacent its intersection with said body portion, the central opening in the annular wiper element being frusto-conical with the major diameter of the frustum being greater than that of the rod passing therethrough and its minor diameter slightly less than that of the rod, so that only the tip of the lip of the wiper element is in contact with the rod while the remaining inner surface of the wiper element slopes progressively away from said rod surface.

2. A wiper assembly as defined in claim 1 wherein the rear wall of said cavity, in a radial direction towards the central axis of opening in the housing, slopes outwardly and the abuting wall of the body portion of said wiper element is shaped to mate and coincide with the slope of the rear wall of said cavity.

3. A wiper assembly as defined in claim 1, wherein the wiper element is boot-shaped in radial cross-section, thus providing an instep portion at the intersection between the lip portion and body portion of said element.

4. A wiper assembly as defined in claim 1 wherein the angle of contact between the tip of the lip portion of the wiper element and the piston rod is approximately 10°.

5. A wiper assembly as defined in claim 1 wherein the outer circumferential face of said lip portion extends axially away from said intersection with the body portion of the wiper element to a lesser extent than that of said internal circumferential face, thus forming an outer edge face of the lip portion which slopes axially inward from the point of contact of the tip of the lip with the rod, such that said outer edge face is substantially parallel to the outer wall of said cavity.

6. A wiper assembly as defined in claim 1 wherein the outer edge face of the lip portion slopes axially inward at an angle of approximately 15° to a line perpendicular to the central axis of said rod, so as to provide a circumferential forward face on said wiper element having a sharp scraping action on the surface of the rod during its return stroke.

7. A wiper assembly as defined in claim 1 wherein the pressure exerted on the lip through the radially inward force of the spring means is of sufficient magnitude to maintain the tip of the lip in intimate contact with the surface of the rod, with the capability of permitting temporary lifting of such tip under excessive internal fluid pressure applied against the inner surface of said lip and following radial motion of the rod which can be induced by system vibration or external side loading.

8. An annular wiper element designed for mounting on a piston rod, for wiping said rod during axial reciprocating movement through said element, formed of a rigid polytetrafluoroethylene resin, said wiper element being substantially bootshaped in radial cross-section and comprising a relatively thick walled cylindrical body portion and an integral cylindrical lip portion extending axially from said body portion, the outer diameter of said lip portion being substantially smaller than the outer diameter of said body portion thus forming an instep at the intersection of said lip and body portions; said element having an outer linear face the extremities of which are defined by the major diameter of the body portion and an opposite linear face the extremities of which are defined by the major diameter of said lip portion; said outer face sloping inwardly from the major circumference of the body portion and in a direction toward said lip portion; said element having a continuous frustoconical inner wall extending from the outer linear face of the body portion to the opposite face of said lip portion, said inner wall being of progressively decreased diameter in the direction recited such that the slope of said face is at an angle of approximately 10°.

9. A wiper element in accordance with claim 8 wherein said body portion outer face and the opposite face on the end of the lip portion are generally parallel.

* * * * *